United States Patent Office 3,261,811
Patented July 19, 1966

---

3,261,811
PROCESS OF PRODUCING AROMATIC POLYAM-
IDE-ESTERS FROM POLYIMINOLACTONES
William Earl Tatum, Tonawanda, N.Y., assignor to E. I.
du Pont de Nemours and Company, Wilmington, Del.,
a corporation of Delaware
No Drawing. Filed Nov. 21, 1963, Ser. No. 325,497
3 Claims. (Cl. 260—47)

This invention relates to the preparation of aromatic polyimide articles and coatings. More particularly, it relates to the preparation of relatively stable intermediates than can be easily converted to the polyimides when desired.

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acide, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired. Other objects will appear hereinafter.

The objects are accomplished by the use of an intermediate linear polymer, an aromatic polyamide-ester having the formula:

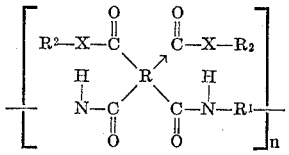

wherein

The arrows denote isomerism [1];
R is an aromatic tetravalent organic radical;
R[1] is arylene;
R[2] is alkyl or aryl;
X is oxygen or sulfur (chalcogen); and
n is an integer sufficiently high to provide a film-forming polymer, i.e. having an inherent viscosity at 30° C. of at least 0.1, preferably 0.3–5.0, as measured as a 0.5% solution in a suitable solvent (concentrated sulfuric acid, N,N-dimethylacetamide, etc.).

In the process of my invention, the polyamide-ester is prepared from a polyisoimide or, more accurately, from a polyiminolactone [2] having the following formula:

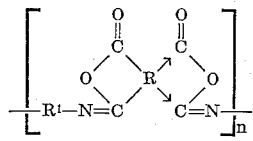

by reacting the polylactone with an alcohol to form the polyamide-ester. The polyiminolactone may be prepared by any of several methods. One method, as dis-

---

[1] In any recurring unit the groups to which arrows point may exist as shown or in interchanged position.
[2] Anhydrides of acids in which the C=O groups are ortho give 5-imino-γ-lactones. Anhydrides of acids in which the C=O groups are peri give 6-imino-δ-lactones.

closed in copending U.S. application Serial No. 325,479, filed November 21, 1963, by Rudolph J. Angelo and assigned to the assignee of the present application involves reacting an aromatic dianhydride and an aromatic diamine under conditions to form a polyamide-acid followed by treatment with N,N'-disubstituted carbodiimides of the formula R[7]—N=C=N—R[7] wherein R[7] is alkyl or aryl, preferably n-butyl, phenyl, meta-tolyl, para-tolyl, meta-chlorophenyl, para-chlorophenyl, meta-nitrophenyl, cyclohexyl, para-methoxyphenyl or alpha-naphthyl.

Another method for preparing the polyiminolactones is disclosed in copending U.S. application Serial No. 325,441, filed November 21, 1963, by John A. Kreuz and assigned to the assignee of the present application. This method involves treating a polyamide-acid with a compound from the group consisting of lower fatty acid halides, halogenated lower fatty acid halides, halogenated lower fatty acid anhydrides, aryl phosphonic dihalides and thionyl halides to form the polyiminolactone.

The first step, the preparation of the polyamide-acid composition, involves reacting at least one aromatic diamine having the structural formula $H_2N$—$R^1$—$NH_2$ with at least one tetracarboxylic acid dianhydride having the structural formula

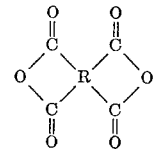

wherein R is a tetravalent aromatic radical and R[1] is arylene, in an organic solvent for at least one of the reactants, the solvent being inert to the reactants, preferably under anhydrous conditions, for a time and at a temperature sufficient to provide the polyamide-acid:

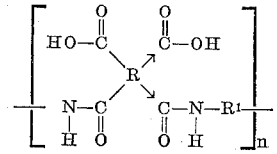

It should be understood that it is not necessary that the polymeric component of the composition be composed entirely of the polyamide-acid. This is particularly true since conversion to other intermediates and, eventually, conversion to the polyimide is contemplated. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.1, preferably 0.3–5.0. The inherent viscosity is measure at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

Inherent viscosity $$= \frac{\text{natural logarithm} \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

By use of the term "solution," whether it is a solution of the polyamide-acid, the polyiminolactone or the polyamide-ester, it is meant to define a solid dissolved in a liquid and vice versa. These latter, liquids dissolved in solids, are commonly called gels. The gels may exist as homogeneous masses of liquid and solid in any form.

The starting materials for forming the polyamide-acids are aromatic diamines and aromatic tetracarboxylic acid dianhydrides. The organic diamines are characterized by the formula:

$$H_2N—R^1—NH_2$$

where $R^1$ is a divalent aromatic radical (arylene), preferably selected from the following groups: phenylene, naphthylene, biphenylene, anthrylene, furylene, benzfurylene and

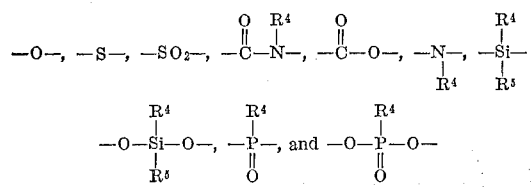

wherein $R^3$ is selected from the group consisting of an alkylene chain having 1–3 carbon atoms,

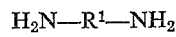

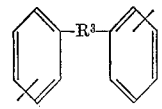

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4′-diamino-diphenyl methane; 4,4′-diamino-diphenyl sulfide; 4,4′-diamino-diphenyl sulfone; 3,3′-diamino-diphenyl sulfone; 4,4′-diamino-diphenyl ether; 2,6-diamino-pyridine; bis-(4-amino-phenyl) diethyl silane; bis-(4-amino-phenyl) diphenyl silane; benzidine; 3,3′-dichloro-benzidine; 3,3′-dimethoxy benzidine; bis-(4-amino-phenyl) ethyl phosphine oxide; bis-(4-amino-phenyl) phenyl phosphine oxide; bis-(4-amino-phenyl)-N-butyl-amine; bis-(4-amino-phenyl)-N-methylamine; 1,5-diamino-naphthalene; 3,3′-dimethyl-4,4′-diaminobiphenyl; N-(3-aminophenyl)-4-aminobenzamide; 4-aminophenyl-3-aminobenzoate; and mixtures thereof.

The aromatic tetracarboxylic acid dianhydrides are characterized by the following formula:

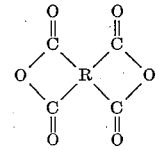

wherein R is a tetravalent aromatic radical, e.g.

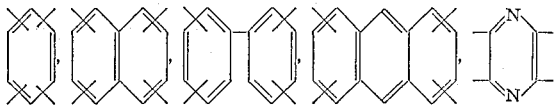

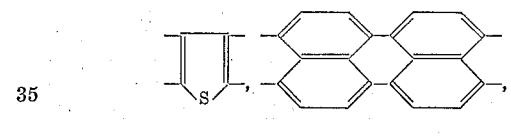

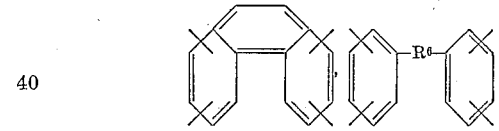

wherein $R^6$ is selected from the group consisting of $R^3$ and

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

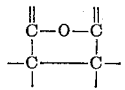

or

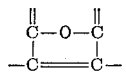

Illustrations of dianhydrides suitable for use in the present invention include:

Pyromellitic dianhydride;
2,3,6,7-naphthalene tetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhydride;
2,2-bis(3,4-dicarboxyphenyl) propane dianhydride;
Bis(3,4-dicarboxyphenyl) sulfone dianhydride;
3,4,9,10-perylene tetracarboxylic dianhydride;
Bis(3,4-dicarboxyphenyl) ether dianhydride;

Naphthalene-1,2,4,5-tetracarboxylic dianhydride;
Naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
Phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
Bis(2,3-dicarboxyphenyl) methane dianhydride;
Bis(3,4-dicarboxyphenyl) methane dianhydride;
Bis(3,4-dicarboxyphenyl) sulfone dianhydride;
Benzene-1,2,3,4-tetracarboxylic dianhydride;
3,4,3',4'-benzophenone tetracarboxylic dianhydride;
2,3,2',3'-benzophenone tetracarboxylic dianhydride;
2,3,3',4'-benzophenone tetracarboxylic dianhydride;
Pyrazine-2,3,5,6-tetracarboxylic dianhydride;
Thiophene-2,3,4,5-tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methyl-formamide and butyrolactone. The solvents can be used alone, in combinations of solvents, or in combination wtih poor solvents such as benzene, benzonitrile, dioxane, xylene, toluene and cyclohexane.

In the next step, the polyamide-acid is converted to a polylactone having the formula:

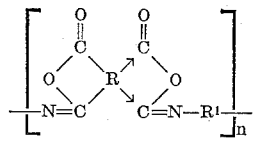

One method involves adding an N,N-disubstituted carbodiimide in a solvent, e.g., N,N-dicyclohexyl carbodiimide in N,N-dimethylacetamide. The solvent is usually the same solvent htat had been used in forming the polyamide-acid. It is necessary to add at least the stoichiometric amount of the carbodiimide (at least 1 mole per amide-acid linkage). Water is removed and adds to the carbodiimide converting the latter to a substituted urea:

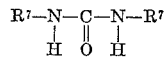

The urea usually precipitates and is removed by centrifuging or filtering, leaving a solution (as defined previously) of the polylactone. If the urea does not precipitate, it can be removed by washing.

Another method for converting to the polylactone involves the addition of one of the following cyclizing agents to the polyamide-acid solution: lower fatty acid halide, halogenated lower fatty acid halide, halogenated lower fatty acid anhydride, aryl phosphonic dihalide and thionyl halide. Representative cyclizing agents in this group include: acetyl chloride, bromide, iodide and fluoride; propionyl chloride, bromide, iodide and fluoride; isobutyryl chloride, bromide; n-butyryl chloride, bromide; valeryl chloride; mono-, di-, and tri-chloroacetyl chloride; bromoacetyl bromide; chloroacetic anhydride; trifluoroacetic anhydride; phenyl phosphonic dichloride; thionyl chloride, bromide, fluoride and chlorofluoride. Some of the cyclizing agents operate successfully alone; e.g., trifluoroacetic anhydride. The others benefit by the coaction of a tertiary amine; and the cyclizing agent is usually added at room temperature (20–30° C.) along with the tertiary amine. The tertiary amine may be selected from the following: trimethylamine, triethylamine, tri-n-butylamine, N,N-dimethylethanolamine, N,N-dimethyldodecylamine, triethylenediamine, pyridine, the picolines, 2,6-lutidine, 2,4,6-collidine, quinoline, pyrazine and 2-methylpyrazine. Three particularly useful treatments for forming polylactones are: treatment of the polyamide-acid composition with chloroacetic anhydride and 2-methylpyrazine; with phenyl phosphonic dichloride and pyridine; and with trifluoroacetic anhydride alone.

In the next step of the process, the polylactone composition is treated with an alcohol or thiol, i.e., a compound $R^2$—XH wherein X is a chalcogen (oxygen or sulfur) to form the corresponding polyamide-ester or thioester. This conversion may be carried out on a solution of the polylactone, or on a shaped structure such as a film or a filament. The operable alcohols include methanol, ethanol, n-propanol, isopropanol, the butanols, the pentanols, the hexanols, 2-ethyl hexanol, isooctyl alcohol, lauryl alcohol, i.e. aliphatic alcohols of 1–12 carbon atoms, phenol and other aromatic alcohols, ethanethiol and 1–12 carbon atom aliphatic thiols, cyanoethanol and other substituted aliphatic alcohols of 1–12 carbon atoms, etc. The lower aliphatic alcohols and phenol are preferred. This reaction is performed at room temperature and the resulting product, the polyamide-ester can be used as obtained, i.e., with the solvent in which the reaction was run. The polyamide-ester composition may be stored at this point for later use or it may be immediately used to form shaped articles.

The polyamide-esters, when isolated, are found to be colorless or light yellow solids. They have strong infrared bands at 3.0–3.07 microns due to N—H bonds of the amide, 5.8 microns due to C=O bonds of the ester and 6.05 microns due to C=O bonds of the amide.

After shaping the composition composed predominantly of the polyamide-ester either immediately or after storage or after sale, preferably still laden with solvent (usually at least 60% solvent), into a useful article, e.g., filament, film, tube, rod, powder, etc., and drying the article, it is preferred to convert the polyamide-ester to another polymer to modify the properties of the shaped structure. Thus, the polyamide-ester may be converted by heat treatment to the corresponding polyimide, specifically by heating to a temperature of at least 125° C., preferably at least 150° C., to drive off alcohol. At 300° C. the conversion occurs in about 10 minutes. The polyimide has the following structural formula:

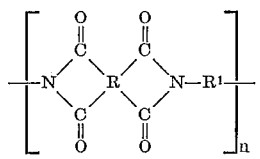

wherein

R is an aromatic tetravalent radical;
R¹ is arylene; and
$n$ is an integer sufficiently high to provide an inherent viscosity of at least 0.1, preferably 0.3–5.0, as measured as a 0.5% solution in a suitable solvent.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer, the polyamide-ester, can be used as a coating composition or as an adhesive layer, being converted in situ to the corresponding polyimide. The liquid composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.); polyolefins (polyethylene, polypropylene, polystyrene, etc.); polyesters (polyethylene terephthalate, etc.), polyimides, polyamides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. The same substrate materials may be used as top layers over the previously-coated substrates to provide laminates wherein the polymeric composition serves as an adhesive layer. Of course, the adhesive layer can be a preformed film of the polyamide-ester composition. Films of the final cyclized polymer can be laminated to any of the above substrates, often with the aid of a commercially available adhesive.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [3] known to those skilled in the art. The majority of the infrared spectra herein were taken on cast films by the use of a Perkin-Elmer Model 21 spectrophotometer and a Perkin-Elmer Infracord spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and C is the concentration of solute in solution measured as grams of polymer per 100 ml. of solution.

*Example 1*

Equimolar amounts of pyromellitic dianhydride and 4,4'-diaminodiphenyl ether in about 9 parts by weight N,N-dimethylacetamide are agitated at 25–40° C. until polyamide-acid having an inherent viscosity of 2.98 (as a 0.5% solution in N,N-dimethylacetamide at 30° C.) is obtained. To 2.94 g. of this solution in a closed container is added 30 ml. of a 1 molar solution of trifluoroacetic anhydride in benzene. Cyclization of the polyamide-acid to poly(iminolactone) occurs very rapidly, giving a yellow gel. The benzene is removed by distillation under reduced pressure. Then excess ethanol is added to convert the poly(iminolactone) to a solution of the ethyl ester of the corresponding polyamide-acid. This solution is stored at room temperature until ready for shaping and conversion of the polyamide-ester to polyimide. After shaping the polyamide-ester film, heating at 300° C. for 10 minutes converts the polymer to polyimide.

*Example 2*

A 6.5% by weight solution in N,N'-dimethylacetamide of a polyamide-acid of pyromellitic dianhydride and 4,4'-diaminodiphenyl ether, the polymer having an inherent viscosity of 3.06 (as a 0.5% by weight solution in N,N'-dimethylacetamide at 30° C.) is cast into a film with a 1.5 mil H-bar. The film sample is subjected under vacuum to a nitrogen atmosphere for 24 hours. The final thickness is about 0.15 mil. The film is immersed for 20 hours at room temperature in a benzene solution containing a molar equivalent (based on the polymer) of trifluoroacetic anhydride. The resulting film, which is essentially all iminolactone when measured by means of infrared spectra, is held for 72 hours at 50° C. Absorption at 5.5 microns is attributed to iminolactone.

The film of the polypyromellitiminolactone of 4,4'-diaminodiphenyl ether, is immersed in methanol for 18 hours. The color of the film changes from orange to yellow. Examination by infrared spectra confirms that all iminolactone units change to amide-ester units. Heating at about 250° C. causes this polyamide-ester to change to polyimide. This temperature indicates that polyamide-ester can be converted more easily to polyimide than the corresponding polyamide-acid.

*Examples 3–4*

Two orange gel films of the polyiminolactone of Example 2 prior to the heat treatment at 50° C. are immersed as follows: one for 22 hours in a 3 mole solution of ethanethiol in benzene containing 2 volume percent of triethylamine, and the other for 46 hours in a 1 mole solution of phenol containing 2 volume percent of triethylamine. This produces the corresponding ethylthio and phenyl esters, respectively. Both films are tough and have zero strength temperatures over 800° C. Their impact strengths are 2.44 and 3.91 kg./cm./mil, respectively, and their tear strengths are 18.0 and 13.6 g./mil. Both convert readily to the corresponding polyimide on heating at 200–300° C.

---

[3] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

Example 5

To a nitrogen-blanketed vessel is added 24.6 g. of a 15% by weight solution in N,N-dimethylacetamide containing 0.01 mole of the polyamide-acid of pyromellitic dianhydride and 2,4-diaminocumene (containing 0.01 mole of polyamide-acid; 0.02 mole, based on amide-acid linkages), the polyamide-acid having been prepared in a manner similar to that in Example 1. N,N-dicyclohexyl carbodiimide (4.53 g., 0.022 mole) in 15 ml. of N,N-dimethylacetamide is added dropwise over 15 min. with agitation. During this time the color of the solution intensifies and precipitation of N,N'-dicyclohexyl urea is observed. The suspension is agitated overnight and then centrifuged to settle out the N,N'-dicyclohexyl urea. The solution is decanted and centrifuged, and the sequence is repeated. The final solution is diluted with 15 ml. of N,N-dimethylacetamide and clarified by filtration.

A portion of this solution is cast into film of 0.1 mil thickness by means of a thin, miniature doctor blade. Solvent removal was accomplished in a vacuum oven under nitrogen. The resulting 0.1 mil film, brilliant yellow in color, exhibited infrared and ultraviolet absorption spectra expected for the iminolactone structure:

IR: 5.55 and 10.0–11.0 microns—very strong (iminolactone); 13.85 microns—absent (normal imide)
UV: Pronounced maximum at 3750 A.

Another portion is mixed with methanol to form the corresponding polyamide-methyl ester. The ester is light in color and, after shaping, readily converts to light-colored polyimide articles of good quality.

Example 6

A thin layer of a 9.18% by weight solution in N,N-dimethylacetamide of the polyamide-acid of pyromellitic dianhydride and 4,4'-diaminodiphenyl ether (inherent viscosity 2.98) prepared as in Example 1 is cast onto a small glass plate with a miniature doctor knife and is then immersed in a bath containing 5.0 grams of N,N'-dicyclohexyl carbodiimide in 30 ml. of dimethylformamide and 70 ml. of N,N-dimethylacetamide. Instantaneously, the outline of the wet film on the glass plate is seen due to the immediate color change, first to yellow and then to orange. The film is allowed to remain in contact with the carbodiimide solution for 8 minutes. The film is then peeled from the glass plate while still in the bath and transferred to a methylene chloride bath. After washing for several minutes in methylene chloride, the film is transferred to a new bath of methylene chloride and finally to one of heptane. Drying is accomplished at 50° C. in a forced-draft oven.

The IR spectrum of the product was consistent with that expected for the iminolactone structure:

5.55 and 10.9 microns—very strong (iminolactone)
13.85 microns—very weak (normal imide)

This film has a zero strength temperature of about 700° C., a density of 1.35 g./cm.$^3$ and a modulus of about 400K p.s.i. at 23° C. When mixed with one mole of methanol (per iminolactone linkage), the film is converted to the corresponding polyamide-methyl ester film. This film is light in color, and readily converts to a light-colored polyimide film of good quality.

Examples 7–11

When a solution of each of the following polylacetones is treated with methanol, the polymer changes to the methyl ester of the corresponding polyamide-acid:

Ex. 7—polylactone of 3,4,3',4'-benzophenone-tetracarboxylic dianhydride and m-phenylenediamine
Ex. 8—polylactone of 2,2',3,3'-diphenyl tetracarboxylic dianhydride and 4,4'-diaminodiphenyl ether
Ex. 9—polylacetone of pyromellitic dianhydride and 4,4'-diaminodipenyl sulfone
Ex. 10—polylacetone of bis(3,4-dicarboxyphenyl) ether dianhydride and 4,4'-diaminodiphenyl sulfide
Ex. 11—polylactone of pyromellitic dianhydride and 4,4'-diaminodiphenyl methane Each of these polyamide-acid methyl ester solutions is stored until needed and then cast into a film which converts to the corresponding polyimide when heated at about 250–275° C.

Examples 12–15

The procedure of Example 2 is repeated, using instead of trifluoroacetic anhydride each of the following cyclizing agents, at 1 molar concentration in a benzene solution also containing pyridine in equimolar concentration:

Ex. 12—propionyl fluoride
Ex. 13—valeryl chloride
Ex. 14—bromoacetyl bromide
Ex. 15—thionyl chloride The iminolactone content of each gel film product is 60–70 mole percent. When the gel films are immersed in methanol for 18 hours, the iminolactone units change to amide-ester units. Heating at about 250° C. causes these polymeric films to become polyimide films.

Examples 16–17

To 26.0 g. (5.90 mmoles) of a solution of the polyamide-acid of pyromellitic acid and 4,4'-diaminodiphenyl ether in N,N-dimethylacetamide (9.5% solids, inherent viscosity of 2.2) in a closed container is added 4.95 g. (23.6 mmoles) of trifluoroacetic anhydride in 12 ml. of benzene. Cyclization of the polyamide-acid to poly(iminolactone) occurs rapidly, giving a bright yellow precipitate, which is not isolated. In Example 16, most of the benzene is removed from the mixture under reduced pressure and 5 ml. (5-fold excess) of methanol is added. The dispersion of the yellow precipitate is converted within an hour to a pale yellow solution of the polyamide-ester in N,N-dimethylacetamide.

In Example 17, the bright yellow precipitate of poly(iminolactone), whose preparation is described above, is collected and washed free from by-products with N,N-dimethylacetamide. The yellow poly(iminolactone) is then added to N,N-dimethylacetamide containing a molar excess of methanol (based on the polymer). Reaction with the methanol gives a polyamide-ester solution in N,N-dimethylacetamide.

Both solutions are stored at room temperature until ready for shaping. After shaping the polyamide-ester into a film, heating at 300° C. for 10 minutes converts the polymer to polyimide.

What is claimed is:

1. A process for preparing shapeable polymeric compositions which comprises treating a polyiminolactone consisting essentially of recurring units of the formula:

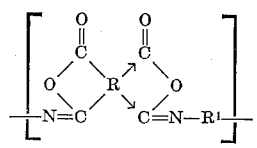

wherein the arrows denote isomerism;
R is a radical selected from the group consisting of

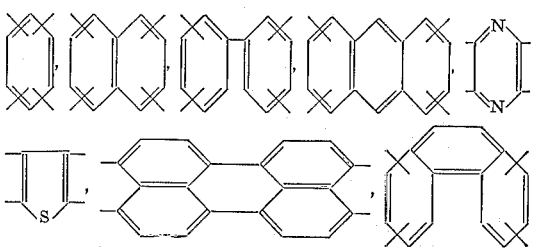

and

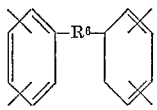

where $R^6$ is selected from the group consisting of an alkylene chain having 1–3 carbon atoms —O—, —S—, —SO$_2$—,

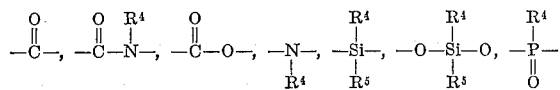

and

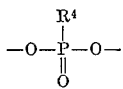

where $R^4$ and $R^5$ are selected from the group consisting of alkyl and aryl;
$R^1$ is arylene;
with a compound $R^2$—XH wherein $R^2$ is selected from the group consisting of alkyl and aryl and X is selected from the group consisting of oxygen and sulfur to form a polyamide-ester having the recurring units of the formula:

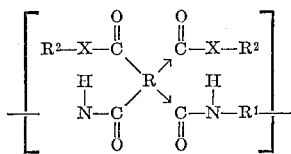

wherein the arrows denote isomerism;
R has the same meaning as above;
$R^1$ is arylene;
$R^2$ is selected from the group consisting of alkyl and aryl; and
X has the same meaning as above.

2. A process as in claim 1 wherein R is the indicated group in a dianhydride of the formula

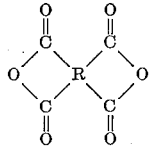

and said dianhydride is selected from the group consisting of pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, 3,4,9,10-perylene tetracarboxylic acid dianhydride and bis(3,4-dicarboxyphenyl) ether dianhydride and 3,4,3',4'-benzophenone tetracarboxylic dianhydride.

3. A process as in claim 1 where $R^1$ is the indicated group in a diamine of the formula H$_2$N—R'—NH$_2$ and said diamine is selected from the group consisting of metaphenylenediamine, paraphenylenediamine, benzidine, 4,4'-diamino-diphenyl propane, 4,4'-diamino-diphenyl methane, 4,4'-diamino-diphenyl ether, 4,4'-diamino-diphenyl sulfone, 2,4-diaminocumene and 4,4'-diamino-diphenyl sulfide.

References Cited by the Examiner
UNITED STATES PATENTS

| | | | |
|---|---|---|---|
| 3,037,966 | 6/1962 | Chow et al. | 260—78 |
| 3,179,634 | 4/1965 | Edwards | 260—78 |

WILLIAM H. SHORT, *Primary Examiner.*

H. D. ANDERSON, *Assistant Examiner.*